(12) United States Patent
Porter et al.

(10) Patent No.: US 8,783,391 B2
(45) Date of Patent: Jul. 22, 2014

(54) POWER VEHICLE WITH ADJUSTABLE VELOCITY PROFILES

(75) Inventors: Steven R. Porter, Burnsville, MN (US); Dale A. Stover, Plymouth, MN (US)

(73) Assignee: The Toro Company, Bloomington, MN (US)

( * ) Notice: Subject to any disclaimer, the term of this patent is extended or adjusted under 35 U.S.C. 154(b) by 947 days.

(21) Appl. No.: 12/882,610

(22) Filed: Sep. 15, 2010

(65) Prior Publication Data
US 2012/0061153 A1   Mar. 15, 2012

(51) Int. Cl.
*B62D 11/02* (2006.01)
*B62D 11/18* (2006.01)

(52) U.S. Cl.
CPC .................. *B62D 11/02* (2013.01); *B62D 11/183* (2013.01)
USPC ........................................ 180/6.32; 180/6.48

(58) Field of Classification Search
USPC ................ 180/6.2, 6.48, 6.32, 6.4; 56/10.2 A
See application file for complete search history.

(56) References Cited

U.S. PATENT DOCUMENTS

| | | | |
|---|---|---|---|
| 4,558,558 A | 12/1985 | Horner, Jr. et al. |
| 5,511,367 A | 4/1996 | Powers et al. |
| 5,848,520 A | 12/1998 | Arfstrom et al. |
| 6,098,385 A | 8/2000 | Turk |
| 6,105,348 A | 8/2000 | Turk et al. |
| 6,155,033 A | 12/2000 | Wians et al. |
| 6,301,864 B1 | 10/2001 | Damie et al. |
| 6,557,331 B2 | 5/2003 | Busboom et al. |
| 6,640,526 B2 | 11/2003 | Velke et al. |
| 6,688,090 B2 | 2/2004 | Velke et al. |
| 6,729,115 B2 | 5/2004 | Bartel |
| 6,782,964 B1 | 8/2004 | Korthals et al. |
| 6,912,831 B2 | 7/2005 | Velke et al. |
| 6,951,092 B2 | 10/2005 | Busboom et al. |
| 6,968,687 B1 | 11/2005 | Poplawski et al. |
| 7,213,662 B2 | 5/2007 | Crumly |
| 7,325,388 B2 | 2/2008 | Wright et al. |
| 7,458,588 B2 | 12/2008 | Kallevig |
| 7,607,283 B2 | 10/2009 | Wright et al. |
| 7,647,754 B2 | 1/2010 | Velke et al. |
| 7,857,089 B1 | 12/2010 | Sugden et al. |
| 8,096,374 B1 | 1/2012 | Papke et al. |
| 8,104,552 B2 | 1/2012 | Papke et al. |
| 2001/0001170 A1 | 5/2001 | Velke et al. |
| 2010/0126792 A1 | 5/2010 | Kallevig |

OTHER PUBLICATIONS

U.S. Appl. No. 13/082,933, filed Apr. 8, 2011, Papke et al.
The Toro Company, The Toro Company History, 7 pages, 2012.
The Toro Company, GrandStand® Mower Parts Catalog, 44 pages, 2009.

(Continued)

*Primary Examiner* — Tony Winner
(74) *Attorney, Agent, or Firm* — Mueting, Raasch & Gebhardt, P.A.

(57) ABSTRACT

Embodiments of the present invention relate to powered vehicles (e.g., lawn mowers) and, more particularly, to a control system for use with such a vehicle. In one embodiment, the vehicle includes a power source such as an internal combustion engine and one or more drive control levers incrementally movable between a neutral position and a maximum velocity position. The system may also include a velocity profile control system having an adjustment member that permits altering a ratio between control lever movement and velocity of an associated drive member or wheel. Thus, the system may alter a maximum potential velocity of the vehicle while the drive control lever(s) are positioned in the maximum velocity position without varying an output level of the power source.

20 Claims, 8 Drawing Sheets

(56) References Cited

OTHER PUBLICATIONS

U.S. Appl. No. 12/827,269, filed Jun. 30, 2010, Papke et al.

"Peaucellier-Lipkin linkage," *Wikipedia*, [online];[retrieved on Sep. 24, 2010] from the Internet. Retrieved from the Internet<URL:http://en.wikipedia.org/wiki/Peaucellier-Lipkin_linkage>; 3 pgs.

"Stander® ZK Commerical Mower Owner's Manual—For Stander ZK Serial # 43106 and higher until superseded," Wright Manufacturing, Inc., May 2008, 20 pgs.

"Stander® ZK Commerical Mower Owner's Manual—For Stander ZK Serial # 46090 and higher until superseded," Wright Manufacturing, Inc., Oct. 2008, 20 pgs.

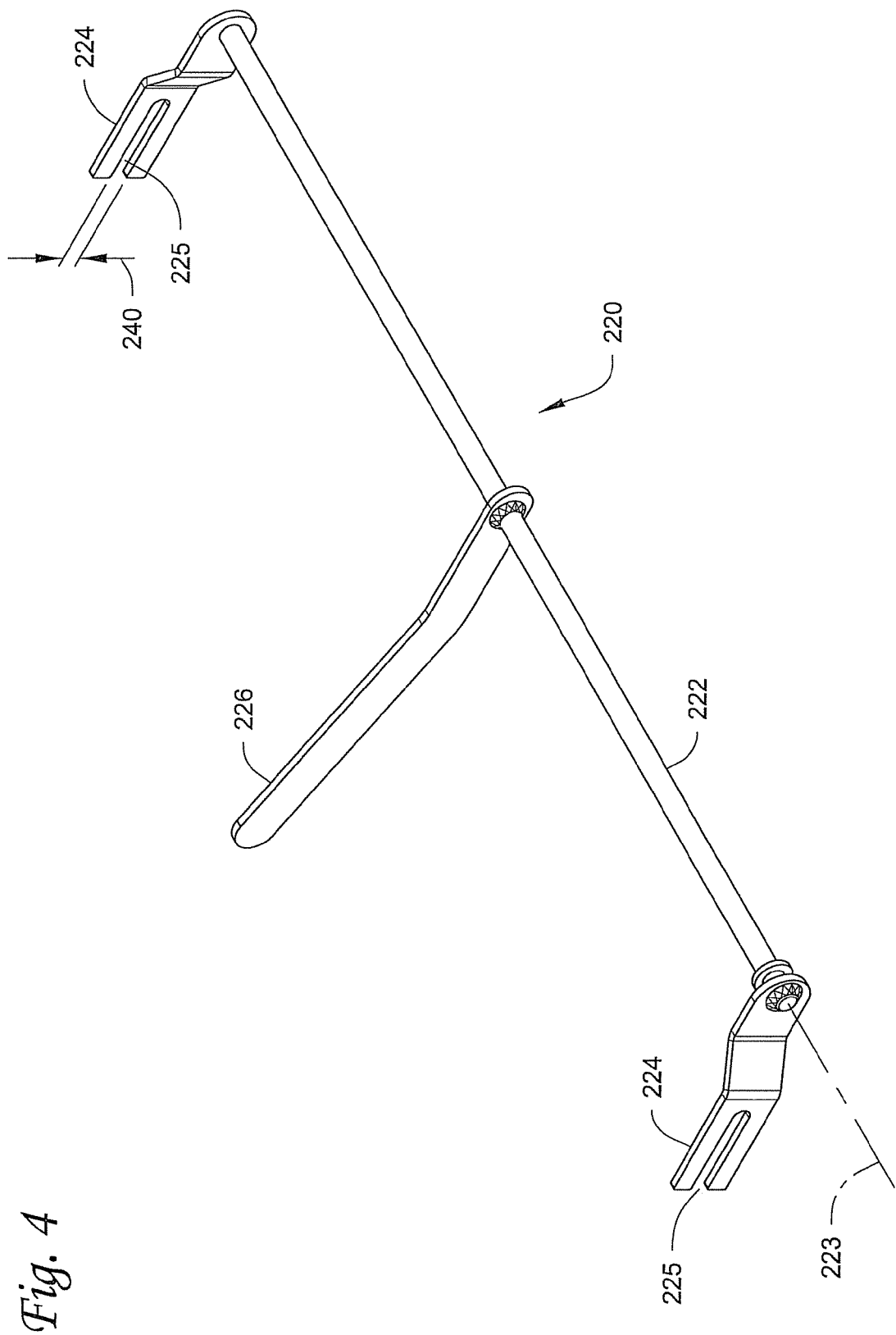

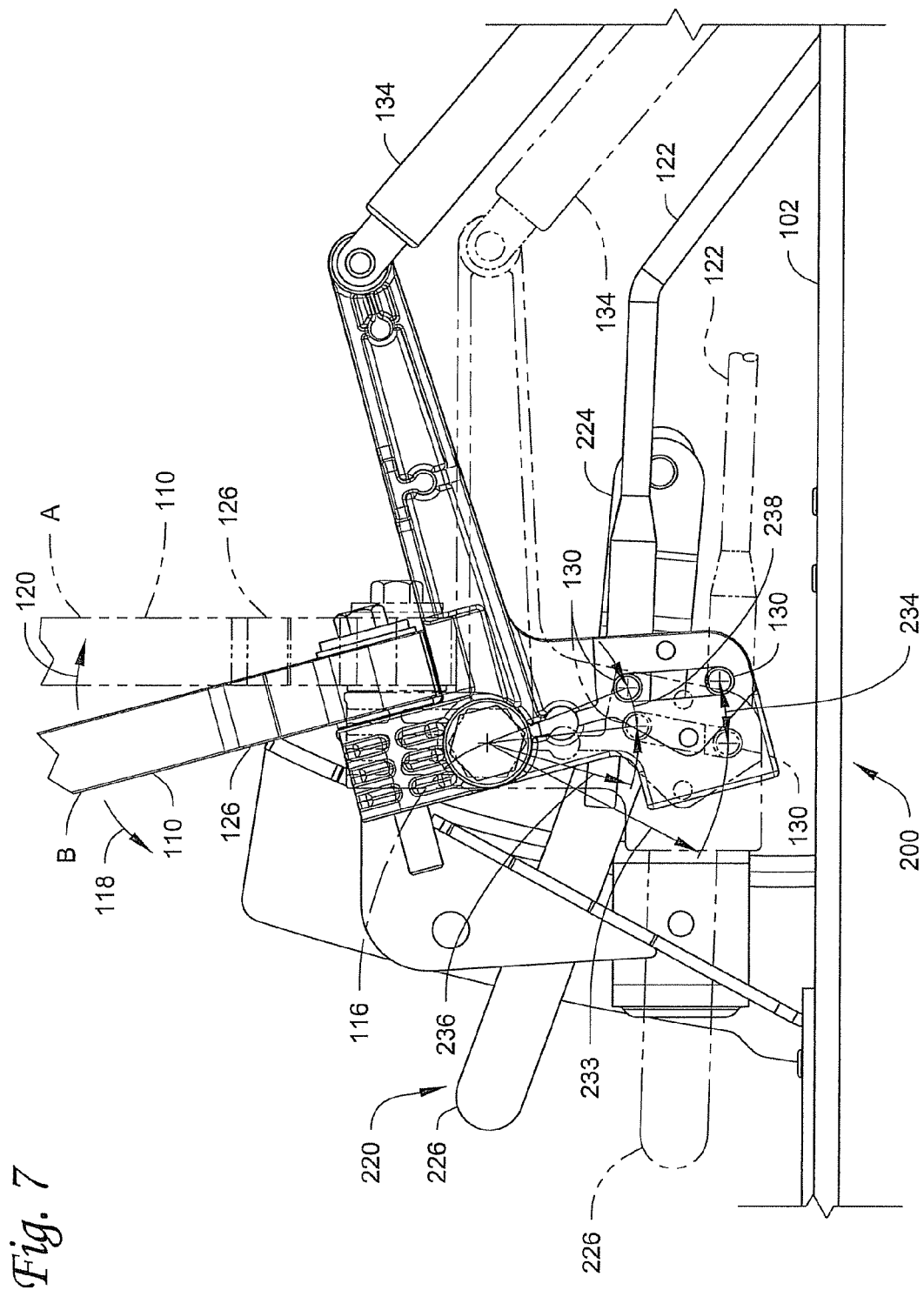

POWER VEHICLE WITH ADJUSTABLE VELOCITY PROFILES

TECHNICAL FIELD

Embodiments of the present invention relate generally to power vehicles and, more particularly, to a velocity profile control system for limiting a potential maximum velocity of a power vehicle independent of an output level (e.g., throttle setting) of the vehicle's power source.

BACKGROUND

Power vehicles for carrying out diverse tasks are known. For instance, power lawn mowers are well known for use in turf maintenance. Such mowers may either be of the walk-behind or riding variety. One type of riding lawn mower that has grown increasing popular in recent years for both homeowners and professionals alike is the riding zero-turning-radius (ZTR) mower. While embodiments of the present invention are directed to control systems for use with a wide variety of riding or walk-behind vehicles, it will, for the sake of brevity, be described with respect to a ZTR mower.

A ZTR mower may typically incorporate a power source (e.g., internal combustion engine or electric motor) coupled to a continuously variable, e.g., hydraulic, drive system. The drive system may include left and right hydraulic motors coupled to left and right drive wheels, respectively. Power may be transmitted from the prime mover to the left and right hydraulic motors, e.g., via one or more pumps, to drive the left and right drive wheels independently. The rotational speed and direction of each drive wheel may then be controlled by an associated drive control lever or "stick" under the control of an operator. By manipulating the control levers independently, each drive wheel can be separately driven forward or backwards at varying speeds. As a result, the mower may be propelled forwardly or in reverse. By powering one wheel in the forward direction and slowing, stopping, or powering the opposite wheel in the reverse direction, the mower can execute a turn.

Each drive control lever may typically be positioned at any location between a neutral and a full forward (and generally a full reverse) position. A stop may define the full forward (and full reverse) position of each control lever.

During mower operation, the operator may seek to place the control levers in the full forward position as this position allows resting of the levers against the stop. This may offer the operator increased comfort, as well as reduce inadvertent lever movement as a result of, for example, traversal of undulating terrain. However, this full forward position may also result in a vehicle speed that is in excess of what is desired for some mowing tasks, e.g., bagging or mowing tall grass. Further, operators that are new to the operation of ZTR mowers may wish to limit the maximum potential speed of the mower until they have familiarized themselves with mower operation.

To reduce maximum mower speed, the operator may back the control levers away from the full forward position. However, this action prevents the operator from resting the levers against the stops. Alternatively, the engine throttle may be reduced. While throttle reduction is effective at reducing maximum vehicle speed (e.g., the speed at the full forward control lever position), it also reduces output to attached implements. For example, throttle reduction may reduce the rotational speed of the blades of an attached cutting deck, potentially reducing the cutting efficiently of the mower.

To address this issue, some mowers may provide a control lever travel limiter. The limiter may selectively restrict travel of each drive control lever by selectively interposing an intermediate stop to limit control lever movement to a position short of the full forward position. While the travel limiter may effectively limit the range of control lever movement, it does so by reducing lever travel, not lever sensitivity. Moreover, such travel limiting devices may be time consuming to adjust, complicated to operate, and/or difficult to engage without shutting down the mower.

SUMMARY

The present invention may overcome these and other issues with prior art mowers by providing, in one embodiment, a self-propelled vehicle that includes a chassis; a drive train attached to the chassis and configured to power a drive member also attached to the chassis; and a prime mover attached to the chassis and operatively coupled to the drive train. Also provided is a control member attached, for movement about an axis, to the chassis, wherein the control member is operable to independently vary an output of the drive member. The control member is movable incrementally between a first position corresponding to zero output of the drive member, and a second position corresponding to a maximum potential output of the drive member. Also provided is a control link including: a first end operatively coupled to the control member; and a second end operatively coupled to the drive train. The vehicle also includes an adjustment member movably coupled to the chassis and movable between a first and a second position. The adjustment member is configured to move the first end of the control link between: a first location, wherein the first end of the control link is located at a first distance from the axis; and a second location, wherein the first end of the control link is located at a second distance from the axis, the second distance less than the first distance.

In another embodiment, a self-propelled vehicle is provided that includes: a chassis; first and second drive trains each operatively attached to the chassis and configured to power first and second drive members, respectively; and a prime mover attached to the chassis and operatively coupled to both the first and second drive trains. Also provided are first and second control levers each pivotally attached about a pivot axis to the chassis and operable to independently vary an output of the first and second drive members, respectively. Each control lever is pivotable incrementally between a first position corresponding to zero output of its respective drive member, and a second position corresponding to a maximum potential forward output of its respective drive member. The vehicle also includes first and second control links each having: first ends coupled to the first and second control levers, respectively; and second ends operatively coupled to the first and second drive trains, respectively. The vehicle further includes a velocity adjustment member coupled to the chassis and movable between a first and a second position. The velocity adjustment member is configured to move the first ends of the first and second control links between: a first location, wherein the first ends are at a first distance from the pivot axis; and a second location, wherein the first ends are at a second distance from the pivot axis, the second distance less than the first distance.

The above summary is not intended to describe each embodiment or every implementation of the present invention. Rather, a more complete understanding of the invention will become apparent and appreciated by reference to the following Detailed Description of Exemplary Embodiments and claims in view of the accompanying figures of the drawing.

BRIEF DESCRIPTION OF THE VIEWS OF THE DRAWING

Embodiments of the present invention will be further described with reference to the figures of the drawing, wherein:

FIG. 4 is a rear perspective view of the adjustment member of the VPCS of FIG. 3;

FIGS. 5A-5C illustrate a portion of the mower and VPCS of FIGS. 2-3 when the adjustment member/VPCS is in the first or maximum potential forward velocity position, wherein: FIG. 5A is a side elevation view; FIG. 5B is a front elevation view of the adjustment member; and FIG. 5C is a section view taken along line 5C-5C of FIG. 5A;

FIGS. 6A-6B illustrate the portion of the mower and VPCS of FIGS. 5A-5C, but with the adjustment member/VPCS shown in a second or reduced potential forward velocity position, wherein: FIG. 6A is a side elevation view; and FIG. 6B is a front elevation view of the adjustment member; and FIG. 7 is an enlarged side elevation view of the VPCS illustrating movement of a drive control member, e.g., lever, between a first or neutral position and a second or full forward position.

Figure 1:
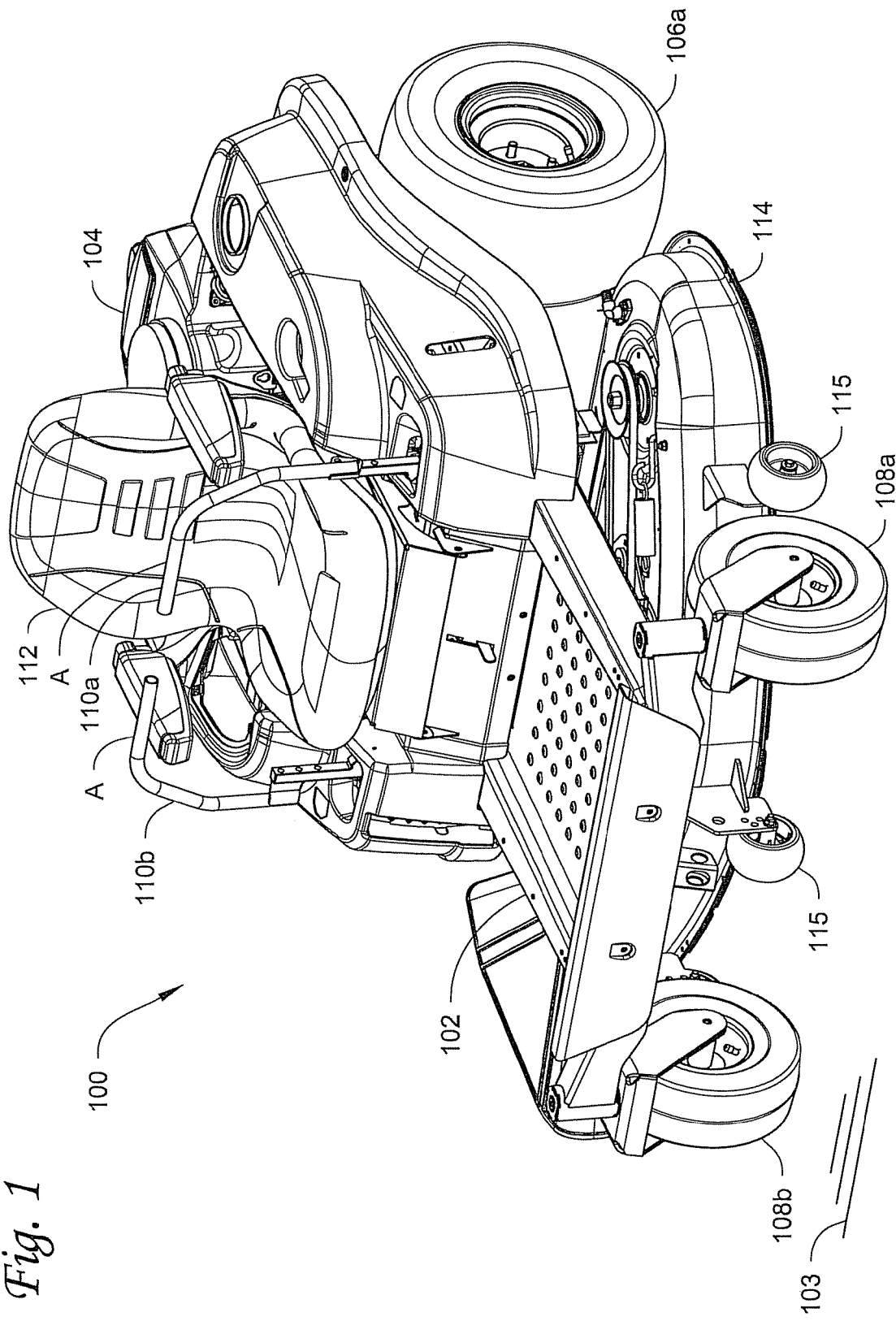
FIG. 1 is a front perspective view of an exemplary vehicle, e.g., riding ZTR mower, incorporating a velocity profile control system (VPCS) in accordance with one embodiment of the invention.

The figures are rendered primarily for clarity and, as a result, are not necessarily drawn to scale. Moreover, certain structure (e.g., various chassis portions/components, fasteners, bearings, cables, and hydraulic components (including but not limited to: conduits; hoses; and fittings, etc.)) may be removed from some or all of the views to better illustrate aspects of the depicted embodiments, or where inclusion of such structure/components is not necessary to an understanding of the various embodiments of the invention. The removal of such structure/components, however, is not to be interpreted as limiting the scope of the invention in any way.

DETAILED DESCRIPTION OF EXEMPLARY EMBODIMENTS

In the following detailed description of illustrative embodiments of the invention, reference is made to the accompanying figures of the drawing which form a part hereof, and in which are shown, by way of illustration, specific embodiments in which the invention may be practiced. It is to be understood that other embodiments may be utilized and structural changes may be made without departing from the scope of the instant invention.

Embodiments of the present invention are directed to power vehicles having a power source and, more particularly, to self-propelled vehicles including a velocity profile control mechanism or system for changing a maximum potential velocity of the vehicle while output (e.g., throttle setting) of the power source is maintained at a constant level. Accordingly, the maximum potential speed of the vehicle may be adjusted without adversely impacting power delivered to other vehicle subsystems. VPCS in accordance with embodiments of the instant invention may also be easily manipulated by an operator without the need to step off the mower and without the need for tools.

Unlike some systems that provide a travel limiter to restrict a maximum position of a speed control input (e.g., a speed control lever) to a lesser or intermediate position, embodiments of the present invention may provide velocity control systems that actually vary a ratio of input (control lever movement) to output (vehicle ground speed) for a fixed power source output. Thus, unlike travel limiters, the full range of control lever movement remains available regardless of the setting of the velocity profile control mechanism.

While the general construction of the power vehicle is not necessarily central to an understanding of the invention (e.g., configurations other than those illustrated may be utilized without departing from the scope of the invention), embodiments of an exemplary vehicle will now be briefly described.

FIG. 1 illustrates a vehicle, e.g., ZTR mower 100, having a chassis 102 supporting a power source or prime mover, e.g., internal combustion engine 104. A pair of transversely opposing, ground-engaging drive members, e.g., first and second drive wheels or drive wheel assemblies 106 (only left drive wheel 106a visible in FIG. 1, with right drive wheel being a mirror image), may be coupled for powered rotation to opposing sides of the chassis 102 to support and propel the mower 100 relative to a ground surface 103. A pair of front swiveling castor wheels 108a and 108b may also be provided to support the front end of the mower 100 relative to the ground surface.

As used herein, relative terms such as "left," "right," "forward," "aft," "rearward," "top," "bottom," "upper," "lower," "horizontal," "vertical," and the like are from the perspective of one operating the mower 100 while the mower is in an operating configuration, e.g., while the mower 100 is positioned such that the wheels 106 and 108 rest upon the generally horizontal ground surface 103 as shown in FIG. 1. These terms are used herein only to simplify the description, however, and not to limit the scope of the invention in any way.

Moreover, the suffixes "a" and "b" may be used throughout this description to denote various left- and right-side parts/features, respectively. However, in most pertinent respects, the parts/features denoted with "a" and "b" suffixes are substantially identical to, or mirror images of, one another. It is understood that, unless otherwise noted, the description of an individual part/feature (e.g., part/feature identified with an "a" suffix) also applies to the opposing part/feature (e.g., part/feature identified with a "b" suffix). Similarly, the description of a part/feature identified with no suffix may apply, unless noted otherwise, to both the corresponding left and right part/feature.

Each drive wheel 106 may be powered by a separate drive train, e.g., hydraulic drive unit (see FIG. 5A), which is, in the illustrated embodiment, configured as an integrated hydrostatic transaxle (IHT) 105. Each IHT may include a pump and a hydrostatic motor integrated into a single housing. Both left and right IHTs 105 may be attached (e.g., bolted) to the chassis 102 and be operatively coupled to the engine 104 (e.g., via a belt connecting a drive sheave of the engine to an input sheave of the IHTs) for powering the drive wheels. While not illustrated, other drive trains, e.g., mechanical gear or pulley driven systems, may also be utilized without departing from the scope of the invention. Moreover, other power sources, e.g., one or more electric motors, could be substituted in place of the engine 104.

Although the illustrated mower has the drive wheels 106 in the rear, this configuration is not limiting. For example, other embodiments may reverse the location of the drive wheels, e.g., drive wheels in front and castor (or steerable wheels) in the back. Moreover, other configurations may use different wheel configurations altogether, e.g., a tri-wheel configuration. Still further, while embodiments of the invention are herein described with respect to riding ZTR lawn mowers (hereinafter generically referred to merely as a "mower"), those of skill in the art will realize that the invention is equally applicable to other types of walk-behind, ride-behind (e.g., such as those utilizing sulkies), and conventional ride-on mowers, as well as to most any other walk-behind, ride-behind, or ride-on power utility vehicle (e.g., aerator, snow blower, blower/vacuum, spreader, etc.).

A cutting deck 114 may be attached to a lower side of the chassis 102 generally between the drive wheels 106 and the castor wheels 108 in what is commonly referred to as a mid-mount configuration. The cutting deck 114 may form a downwardly-opening enclosure that defines a cutting chamber. The cutting chamber may enclose one or more rotatable cutting blades (not shown) that are each attached to a spindle journalled for rotation to an upper surface of the cutting deck. The cutting blades may be operatively powered, via the spindles, by the engine 104. During operation, power is selectively delivered to the spindles of the cutting deck 114, whereby the blades rotate at a speed sufficient to sever grass and other vegetation as the mower travels over the ground surface 103. In some embodiments, the cutting deck 114 includes deck rollers or anti-scalp wheels 115 to assist with supporting the cutting deck 114 relative to the ground surface.

Figure 2:
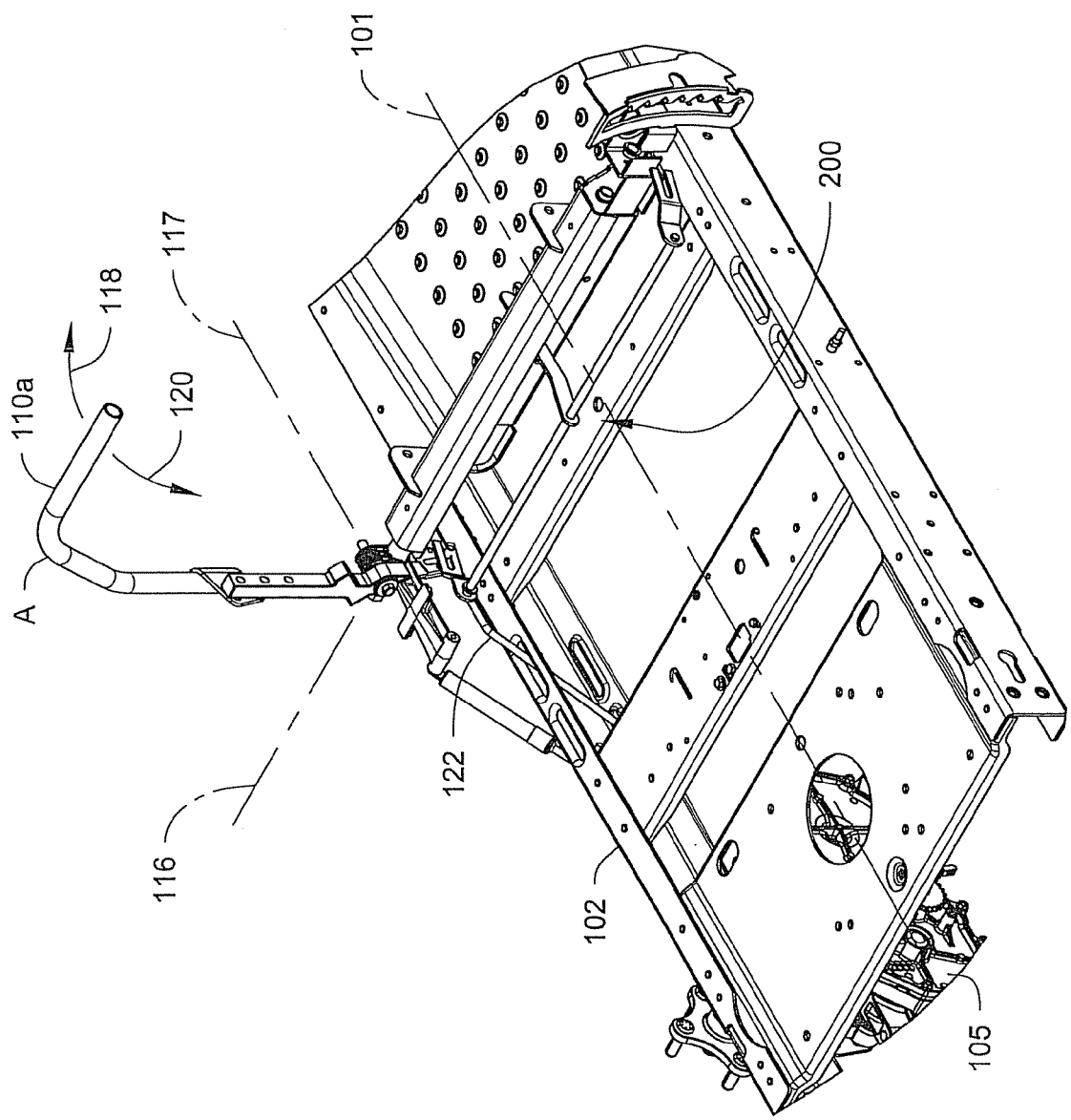
FIG. 2 is a partial rear perspective view of a portion of the VPCS of FIG. 1 with various mower structure removed for visibility.

The mower 100 may also include an operator seat 112 to accommodate the operator during mower use. From the seat 112, the operator may have access to various controls, e.g., engine throttle, deck engagement, engine ignition, etc. Operator directional/speed control members, e.g., left and right drive control levers 110a, 110b (referred to herein merely as "control levers"), may also be provided to permit control of mower speed and direction. Each control lever 110 may be pivotally coupled to the chassis 102 for pivotal movement about an axis, e.g., a transverse pivot axis 116 (see FIG. 2). As a result, each lever 110 may pivot from a first or neutral position "A" (as shown in FIGS. 1 and 2) in a first direction 118 to a second or full forward position "B" (see FIG. 7) corresponding to a maximum potential forward output or velocity of the respective drive wheel. Each control lever may also pivot about the pivot axis 116 in a second direction 120 (see FIG. 2) to a third or full reverse position (not shown) corresponding to a maximum potential reverse output or velocity of the respective drive wheel. During operation, each control lever may move incrementally in either direction 118 or 120 to any position between the neutral position and the full forward position (as well as the full reverse position).

Each control lever may also pivot about a second or longitudinal axis 117 (the axis 117 being parallel to a longitudinal axis 101 of the mower 100 as shown in FIG. 2). Pivoting about the axis 117 may improve ingress to/egress from the seat 112.

As depicted in FIG. 2, as each lever 110 pivots about the axis 116, it may impart translational movement to a first end of a connected control link, e.g., tie rod 122, as further described below. A second end of each tie rod 122 may attach to a pump input arm 124 (see FIG. 5A) of the corresponding IHT 105. The position of the pump input arm 124 may control IHT output, i.e., the rotational speed and direction of the hydrostatic motor and thus its associated drive wheel 106. The tie rod 122 may include rod end connections at one or both of the first and second ends to permit out-of-plane travel.

As one can appreciate, incremental movement of either lever 110 about the axis 116 in the direction 118 may cause corresponding incremental movement of the associated tie rod 122 in a first (e.g., rearward) direction, which may (via displacement of the associated pump input arm 124) produce corresponding rotational output of the respective IHT 105 and drive wheel 106 in the forward travel direction. Similarly, incremental movement of either lever 110 about the axis 116 in the second direction 120 may cause corresponding incremental movement of the associated tie rod 122 in a second (e.g., forward) direction, which may produce rotational output of the respective IHT 105 and drive wheel 106 in the reverse travel direction. The degree to which the levers 110 are pivoted may control the rotational speed of the respective drive wheels 106. As those of skill in the art may appreciate, powering one drive wheel 106 in the forward direction and slowing, stopping, or powering the opposite drive wheel in the reverse direction, will allow the mower to change direction.

While described herein as using a twin lever control system, it is to be understood that this configuration is not limiting as embodiments of the present invention may find application to vehicles having other, e.g., single, control lever configurations or to configurations using other types of control members, e.g., steering wheels. Moreover, while the invention is herein described with respect to a control system for altering velocity, those of skill in the art will realize that embodiments of the invention are equally applicable to systems adapted to control other vehicle parameters.

With this introduction, an exemplary VPCS 200 will now be described with reference primarily to FIGS. 3-7. As stated elsewhere herein, the VPCS 200 may, for a fixed engine throttle setting and position of the drive control lever 110, alter an output of the respective IHT 105 and thus the speed of the associated drive wheel 106. Stated alternatively, the VPCS 200 may provide two different potential maximum vehicle speeds corresponding to the control levers 110 being in the full forward position B (see FIG. 7) even though engine speed remains constant. VPCSs in accordance with embodiments of the present invention may achieve this variation without the use of adjustable control lever stops or the like. As a result, the control levers may be movable through the same arc of rotation regardless of the setting of the VPCS. In one embodiment, the VPCS 200 provides two different velocity settings. However, embodiments wherein the VPCS provides more than two settings are certainly possible without departing from the scope of the invention.

Figure 3:
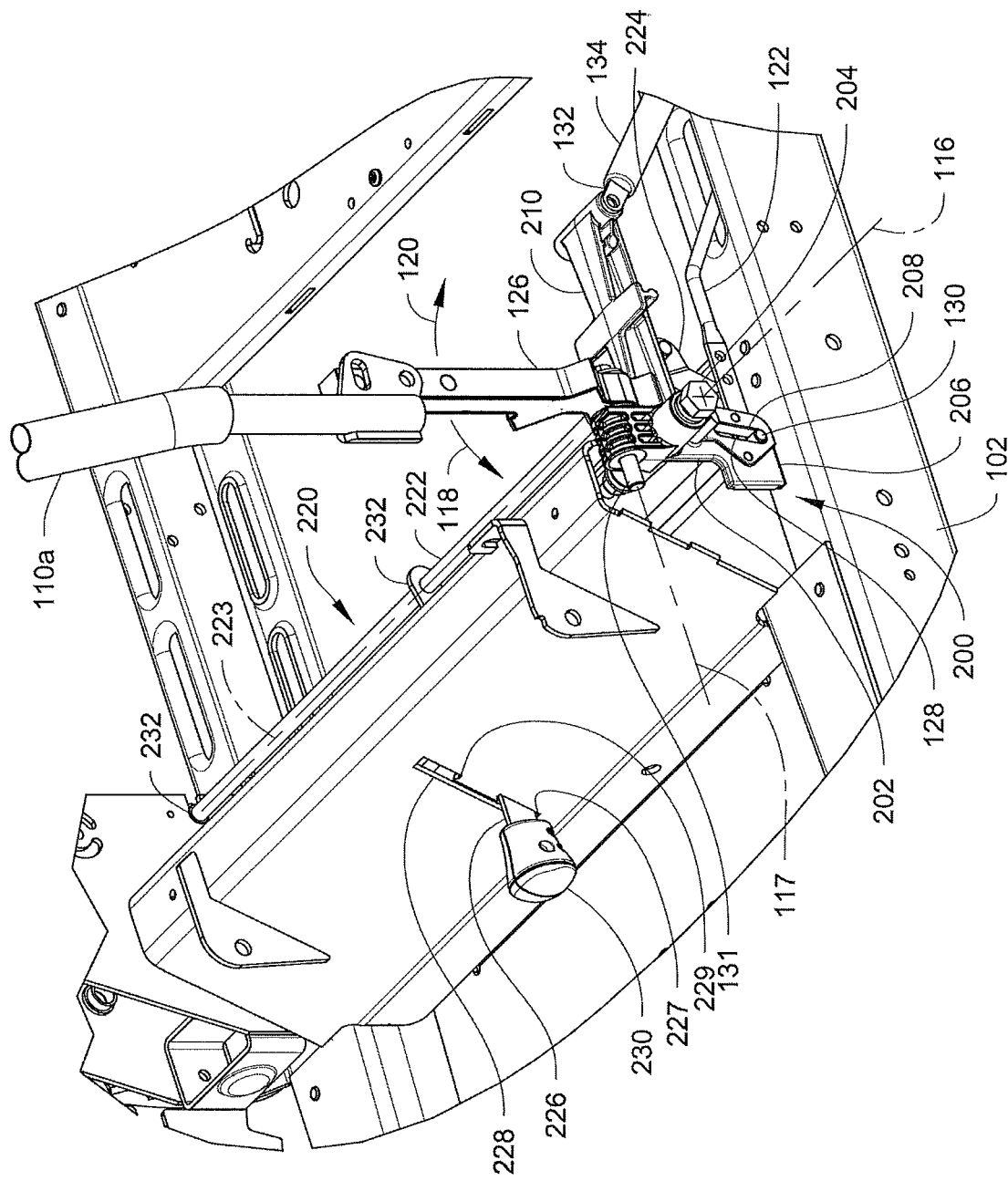
FIG. 3 is a partial perspective view of one side of the mower of FIG. 2, illustrating an adjustment member of the exemplary VPCS, the adjustment member and the VPCS shown in a first or maximum potential velocity position.

FIG. 3 is an enlarged perspective view of one side of the mower 100 with various structure removed to better illustrate the drive control lever 110a, the VPCS 200, and related structure. As shown in this view, each control lever 110 may include an arm 126. The arm 126 may attach to a bellcrank 202 with a bolt or pin 131, the latter defining the longitudinal pivot axis 117. While shown as separate components, the control lever 110 may, as used herein, refer to an assembly that includes not only the control lever 110, but also either or both of the arm 126 and the bellcrank 202.

The bellcrank 202, which may be part of the VPCS, may form a generally L-shaped member that is pivotally attached to the chassis 102, via a fastener or pin 204, such that the bellcrank may pivot about the pivot axis 116. A first arm 206 of the bellcrank 202 may operatively connect to the first end 128 of the tie rod 122. In the illustrated embodiment, the control lever, e.g., the first arm 206, may define an elongate slot 208 that captively receives a pin 130 attached to or otherwise associated with the first end 128 of the tie rod 122.

The control lever, e.g., bellcrank 202, may also include a second arm 210 that, in the illustrated embodiment, extends rearwardly away from the pivot axis 116. The second arm 210 may pivotally attach to a first end 132 of a damper 134 that has its second end 136 pivotally attached to the chassis 102 (see e.g., FIG. 5A). The damper 134 may dampen movement of the bellcrank 202, and thus the control lever 110, during mower operation, e.g., to reduce inadvertent, abrupt lever movements.

As shown in FIG. 3, movement of the control lever 110 in the first direction 118 towards the second or full forward position B (see FIG. 7) causes the bellcrank 202 to pivot in the same direction about the pivot axis 116 (the second position B of the control lever 110 corresponding to the maximum potential output of the respective drive wheel). As the bellcrank 202 pivots in the direction 118, the first arm 206 of the bellcrank moves generally rearwardly, causing the tie rod 122 to also move rearwardly and displace the pump input arm 124 of the IHT 105 (see FIG. 5A). Conversely, movement of the control lever 110 in the second direction 120 results in displacement of the pump input arm 124 in the opposite direction.

The VPCS 200 may further include an adjustment member 220 that is illustrated separately in FIG. 4. The adjustment member 220 may, in one embodiment, include a pivot rod 222 extending transversely to the longitudinal axis of the vehicle (see FIG. 3). The pivot rod 222 of the adjustment member 220 may be journalled to the chassis 102 as indicated by journal connections 232 shown in FIG. 3. As a result, the adjustment member may pivot about a pivot axis 223 defined by the pivot rod.

A forked portion or member 224 that forms an opening, e.g., elongate slot 225, may be positioned at each end of the pivot rod 222 and protrude perpendicular to the axis 223. In the illustrated embodiment, the elongate slots 225 of the forked members 224 are aligned (i.e., are parallel) with one another (relative to the pivot rod 222). The forked members 224, e.g., the elongate slots 225, may be configured to receive and capture the first ends 128 of the tie rods 122 as further described below.

The adjustment member 220 may further include a handle lever 226 fixed to the pivot rod and located, in one embodiment, between the two forked members 224. In the illustrated embodiment, the handle lever 226 and the two forked members 224 are fixed (e.g., welded, staked, etc.) relative to the pivot rod 222 to form a unitary member. The handle lever may protrude outwardly through a shaped cutout 228 formed in a portion, e.g., a sheet metal cover, of the chassis 102 as shown in FIG. 3. The shaped cutout 228 may define at least two detents or ledges, each configured to hold the handle lever 226 at a particular location within the cutout 228. In the illustrated embodiment, a first ledge 227 is formed by a lower surface of the cutout 228 itself, while a second ledge 229 is formed by a protrusion extending into the cutout. As a result, the adjustment member, e.g., handle lever 226, may be movable between a first position corresponding to the handle lever being seated between the first ledge 227 and an overhang 231 (see FIG. 5B) in the cutout, and a second position corresponding to the handle lever being seated against the second ledge 229. A gripping head 230 (shown only in FIG. 3) may be attached to the outer end of the handle lever 226 to facilitate grasping by the operator.

Figure 5B:
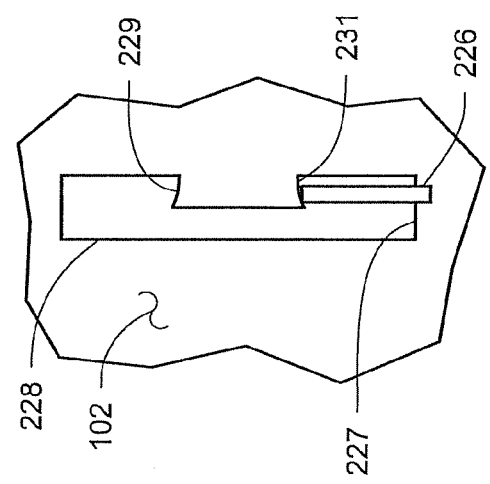
Figure 5A:
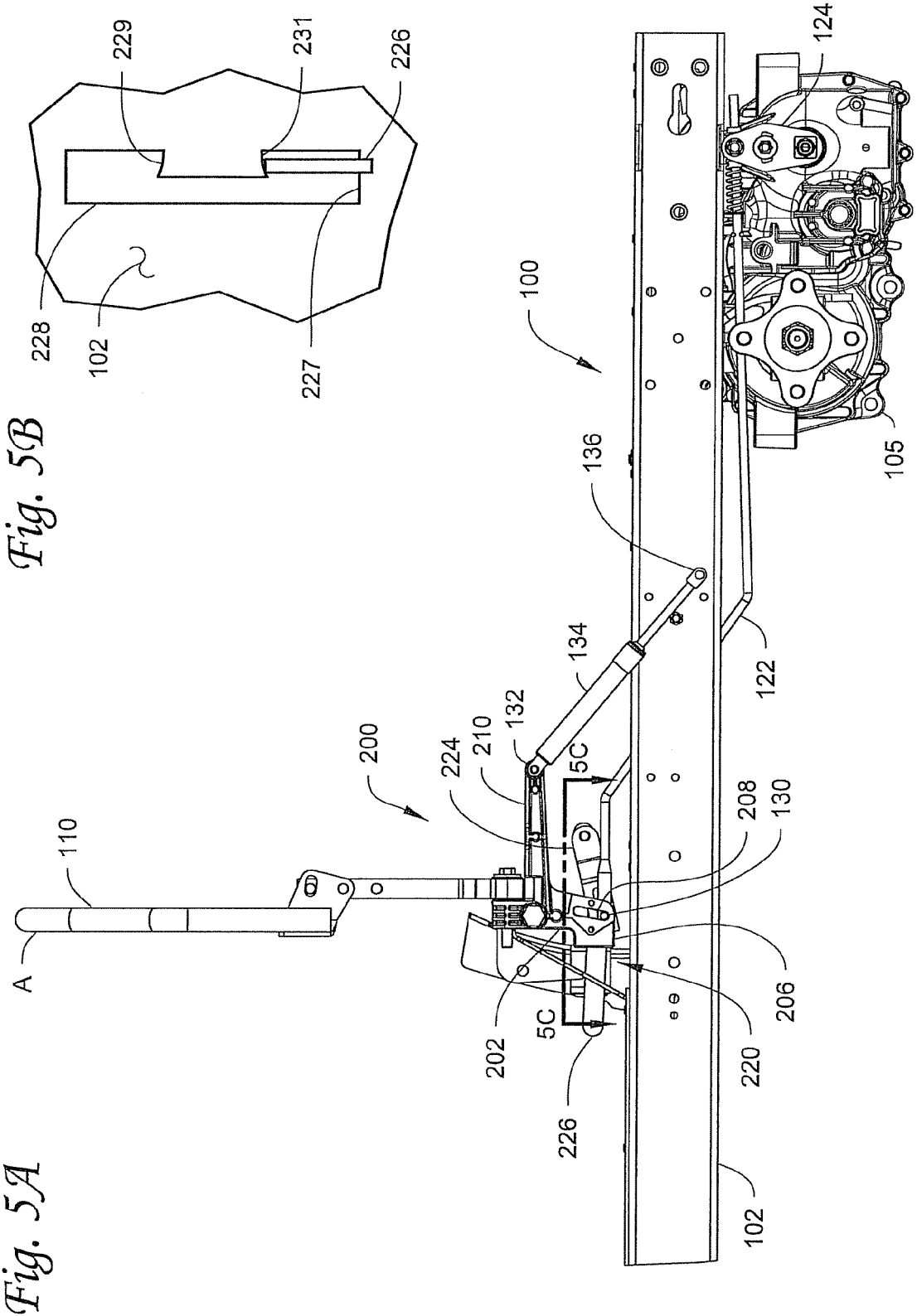

FIG. 5A illustrates a partial side elevation view of the VPCS 200 of the mower 100 with, once again, various mower structure removed for visibility. In this view, the adjustment member 220/handle lever 226 (and thus the VPCS) is shown in the first position as also illustrated in FIGS. 3 and 5B, and the control lever 110 is shown in the first or neutral position A (corresponding to zero output/velocity of the respective drive wheel).

Figure 5C:
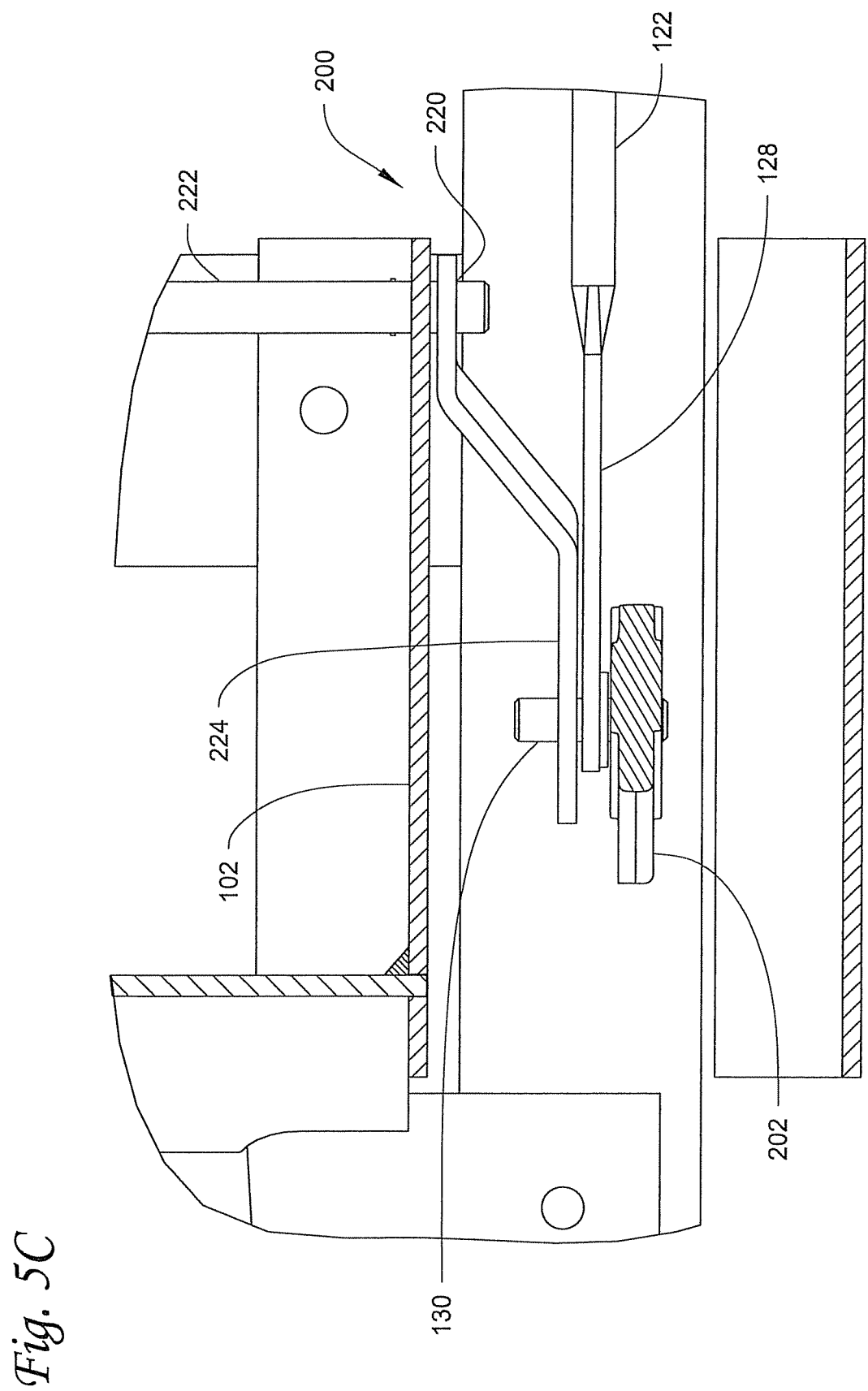
Figure 6B:
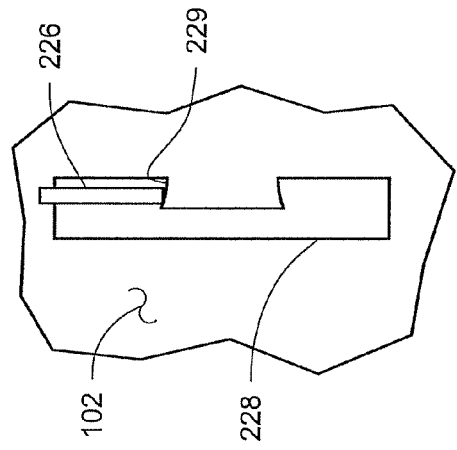
Figure 6A:
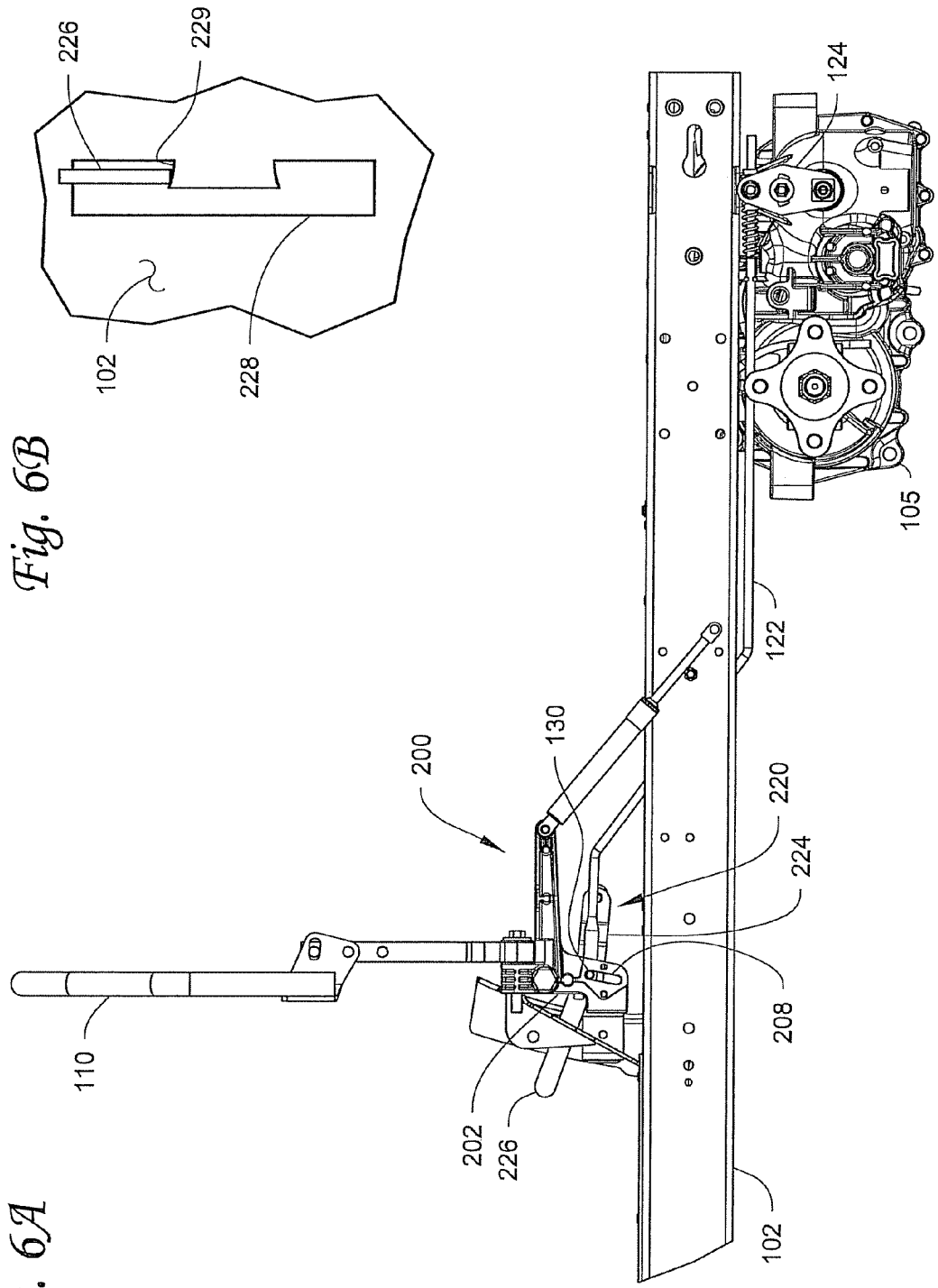

With reference to FIG. 5C, the pin 130 may be pressed into the first end 128 of the tie rod 122 such that it extends into not only the slot 208 as shown in FIG. 3, but also protrudes from an opposite side of the tie rod a sufficient distance to permit engagement with the slot 225 (see FIG. 4) of the forked member 224. Thus, the adjustment member 220 may, as the handle lever 226 moves between the first and second positions, reposition the pin 130, and thus the first end of the tie rod 122, within the slot 208 of the bellcrank 202. FIG. 5A illustrates the location of the pin 130 within the slot 208 when the adjustment member 220/handle lever 226 is in the first position (see also FIG. 5B), while FIG. 6A illustrates the location of the pin 130 within the slot 208 when the adjustment member 220/handle lever 226 is in the second position (see also FIG. 6B illustrating the handle lever 226 resting upon the second ledge 229 corresponding to the second position of the handle lever).

FIG. 7 illustrates an enlarged view of the VCPS 200 and related components/structure. In this view, the control lever 110 is shown in both the first or neutral A position, and the second or fully engaged B position. Moreover, the adjustment member 220 and handle lever 226 are shown in both the first position (broken lines) and the second position.

As shown in FIG. 7, when the adjustment member 220 and handle lever 226 are in the first position, the forked member 224 places the pin 130 of the tie rod 122 at a first location being at a first distance 233 (e.g., radial distance) from the pivot axis 116. As a result, movement of the control lever 110 between the A and B positions results in movement of the pin 130 over a first distance 234 as indicated in FIG. 7.

However, when the adjustment member 220 and handle lever 226 are in the second position (solid lines in FIG. 7), the forked member 224 places the pin 130 of the tie rod 122 at a second location being at a second distance 236 (e.g., radial distance) from the axis 116 that is less than the first distance 233. As a result, movement of the control lever 110 between the A and B positions results in movement of the pin 130 over a second distance 238 that is less than the first distance 234.

When the handle lever 226 is secured in either the first or second positions (e.g., when the handle lever 226 is biased against either the overhang 231 or the second ledge 229 (see, e.g., FIG. 5B), respectively), the pin 130 may be pushed or preloaded against one of the ends of the slot 208. This preload may result in torsion generated in the pivot rod 222. This torsional preload may assist with maintaining the VPCS 200, e.g., the handle lever 226 of the adjustment member 220, in the intended position during mower operation.

In the illustrated example, the control levers 110 may pivot about 15 degrees between the A and B positions. When the adjustment member 220 is in the first position, movement of either control lever 110 from the A position to the B position will vary the respective drive wheel output or speed from zero miles/hour (mph) to a potential maximum output of about 7 mph, yielding a control lever resolution of about 0.4 to about 0.5 (e.g., about 0.47) mph per degree of lever movement. However, when the adjustment member 220 is in the second position, movement of either control lever 110 from the A position to the B position will vary the respective drive wheel speed from zero miles/hour (mph) to a potential maximum output of about 4 mph, yielding a control lever resolution of about 0.2 to about 0.3 (e.g., about 0.27) mph per degree of lever movement. As a result, the movement of the adjustment member may not only alter the maximum potential speed of the mower 100 (at a constant engine throttle setting), but it may also alter the resolution of the control levers.

While described herein with a particular control lever travel range, such a configuration is presented merely as an exemplary range for a ZTR mower such as that illustrated herein. Other embodiments providing more or less travel to accommodate specific functionality are certainly possible. Similarly, the various speed ranges described herein are also exemplary and not intended to limit the scope of the invention.

Embodiments of the present invention may thus permit operator manipulation of the potential maximum speed of a vehicle, for a maximum speed control input (e.g., control lever motion), without altering the output level of the vehicle power source. As a result, the operator may alter the maximum potential velocity of the vehicle (the speed corresponding to when the speed control input is in a maximum velocity position) without altering the power delivery to other vehicle subsystems. Thus, like a control lever travel limiter, embodiments of the present invention may provide a technique to limit maximum vehicle velocity while the control levers are against a forward stop. However, unlike travel limiters, embodiments of the present invention permit full, unrestricted travel of the control levers regardless of the velocity adjustment member setting.

Illustrative embodiments of this invention are discussed and reference has been made to possible variations within the scope of this invention. These and other variations, combinations, and modifications in the invention will be apparent to those skilled in the art without departing from the scope of the invention, and it should be understood that this invention is not limited to the illustrative embodiments set forth herein. Accordingly, the invention is to be limited only by the claims provided below and equivalents thereof.

What is claimed is:

1. A self-propelled vehicle comprising:
   a chassis;
   a drive train attached to the chassis and configured to power a drive member also attached to the chassis;
   a prime mover attached to the chassis and operatively coupled to the drive train;
   a control member attached, for movement about an axis, to the chassis and operable to independently vary an output of the drive member, the control member movable incrementally between a first position corresponding to zero output of the drive member, and a second position corresponding to a maximum potential output of the drive member;
   a bellcrank attached to the control member such that both the control member and the bellcrank pivot about the axis;
   a control link comprising: a first end operatively coupled to the bellcrank; and a second end operatively coupled to the drive train; and
   an adjustment member movably coupled to the chassis and movable between a first and a second position, the adjustment member configured to move the first end of the control link between: a first location, wherein the first end of the control link is located at a first distance from the axis; and a second location, wherein the first end of the control link is located at a second distance from the axis, the second distance less than the first distance.

2. The vehicle of claim 1, wherein the drive train comprises one or more hydrostatic transaxles.

3. The vehicle of claim 1, wherein the drive member comprises a ground-engaging drive wheel.

4. The vehicle of claim 1, further comprising a cutting deck attached to the chassis.

5. The vehicle of claim 1, wherein the adjustment member is pivotally attached to the chassis and further comprises a forked portion defining an elongate slot configured to receive the first end of the control link.

6. A self-propelled vehicle comprising:
   a chassis;
   first and second drive trains each operatively attached to the chassis and configured to power first and second drive members, respectively;
   a prime mover attached to the chassis and operatively coupled to both the first and second drive trains;
   first and second control levers each pivotally attached about a pivot axis to the chassis and operable to independently vary an output of the first and second drive members, respectively, each control lever pivotable incrementally between a first position corresponding to zero output of its respective drive member, and a second position corresponding to a maximum potential forward output of its respective drive member, wherein each of the first and second control levers is attached to a bellcrank such that each bellcrank is also pivotable about the pivot axis;
   first and second control links each comprising: first ends coupled to the bellcrank of the first and second control levers, respectively; and second ends operatively coupled to the first and second drive trains, respectively; and
   a velocity adjustment member coupled to the chassis and movable between a first and a second position, the velocity adjustment member configured to move the first ends of the first and second control links between: a first location, wherein the first ends are at a first distance from the pivot axis; and a second location, wherein the first ends are at a second distance from the pivot axis, the second distance less than the first distance.

7. The vehicle of claim 6, wherein the pivot axis extends transversely to a longitudinal axis of the vehicle.

8. The vehicle of claim 6, further comprising a damper attached between the chassis and one or both of the first and second control levers.

9. The vehicle of claim 6, wherein the first and second drive trains each comprise a hydrostatic transaxle.

10. The vehicle of claim 6, wherein the first and second drive members comprise ground-engaging drive wheel assemblies.

11. The vehicle of claim 6, wherein the vehicle further includes a cutting deck attached to the chassis.

12. The vehicle of claim 6, wherein the adjustment member comprises a pivot rod and a forked member fixed to each end of the pivot rod.

13. The vehicle of claim 12, wherein the adjustment member further comprises a handle lever fixed to the pivot rod and configured to manipulate the adjustment member between the first and second positions.

14. The vehicle of claim 12, wherein each forked member defines an elongate slot configured to receive the first end of one of the control links.

15. The vehicle of claim 6, wherein the bellcrank of each of the first and second control levers defines an elongate slot configured to receive the first end of the first and second control links, respectively.

16. The vehicle of claim 6, wherein each of the first and second control levers are further pivotable about the pivot axis to a third position corresponding to a maximum reverse output of its respective drive member.

17. A differentially steerable, self-propelled vehicle comprising:
- a chassis;
- first and second hydraulic drive units attached to the chassis and configured to power first and second drive wheels, respectively;
- a prime mover attached to the chassis and operatively coupled to both the first and second hydraulic drive units;
- first and second control levers pivotally attached about a transverse pivot axis to the chassis and operable to independently vary a velocity of the first and second drive wheels, respectively, each control lever pivotable incrementally between a first position corresponding to zero velocity of its respective drive wheel, and a second position corresponding to a maximum potential velocity of its respective drive wheel, wherein each of the first and second control levers is further pivotable about a second pivot axis;
- first and second tie rods each comprising: a first end coupled to the first and second control levers, respectively; and a second end operatively coupled to the first and second hydraulic drive units, respectively; and
- a velocity adjustment member pivotally coupled to the chassis and pivotable between a first and a second position, the velocity adjustment member configured to move the first ends of the first and second tie rods between: a first location, wherein the first ends are at a first distance from the transverse pivot axis; and a second location, wherein the first ends are at a second distance from the transverse pivot axis, the second distance less than the first distance.

18. The vehicle of claim 17, wherein the adjustment member comprises a pivot rod extending transversely to a longitudinal axis of the vehicle, and first and second forked members fixed to ends of the pivot rod and protruding perpendicular to an axis of the pivot rod.

19. The vehicle of claim 18, wherein the first and second forked members each define a slot that receives therein a pin fixed to the first end of the first and second tie rods, respectively.

20. The vehicle of claim 17, wherein each of the first and second control levers comprises first and second bellcranks, respectively, the first and second bellcranks each defining a slot that receives therein a pin fixed to the first end of the first and second tie rods, respectively.

* * * * *